(12) United States Patent
Juan

(10) Patent No.: US 6,401,106 B1
(45) Date of Patent: Jun. 4, 2002

(54) METHODS AND APPARATUS FOR PERFORMING CORRELATION OPERATIONS

(75) Inventor: Yujen Juan, Princeton Junction, NJ (US)

(73) Assignee: Systems On Silicon, Inc.

( * ) Notice: Subject to any disclaimer, the term of this patent is extended or adjusted under 35 U.S.C. 154(b) by 0 days.

(21) Appl. No.: 09/633,693

(22) Filed: Aug. 7, 2000

(51) Int. Cl.[7] .............................................. G06F 17/15
(52) U.S. Cl. ...................................... 708/422; 708/426
(58) Field of Search ................................ 708/422, 426, 708/319, 603

(56) References Cited

U.S. PATENT DOCUMENTS

| | | | |
|---|---|---|---|
| 4,404,645 A | | 9/1983 | Elings et al. ................ 364/728 |
| 5,103,416 A | | 4/1992 | Cavallotti et al. ...... 364/724.16 |
| 5,383,145 A | | 1/1995 | Sakiyama et al. ...... 364/724.16 |
| 5,566,101 A | | 10/1996 | Kodra .................... 364/724.16 |
| 5,784,306 A | * | 7/1998 | Ogletree ..................... 708/603 |
| 5,896,304 A | * | 4/1999 | Johnson et al. ............. 708/422 |
| 6,021,421 A | * | 2/2000 | Retter et al. ................. 708/422 |
| 6,260,053 B1 | * | 7/2001 | Maulik et al. .............. 708/319 |
| 6,295,545 B1 | | 9/2001 | Hsu et al. .................... 708/319 |
| 6,308,191 B1 | | 10/2001 | Dujardin et al. ............ 708/319 |

* cited by examiner

Primary Examiner—David H. Malzahn
(74) Attorney, Agent, or Firm—Straub & Pokotylo; Michael P. Straub

(57) ABSTRACT

Methods and apparatus for implementing an enhanced digital signal processor through the addition of modular computation units which can be operated in parallel are described. In various embodiments the computation units are implemented as configurable computation cells which are arranged to form a computation engine which supplements conventional DSP circuitry. The computation cells can be used to perform frequently used DSP functions such a cross-correlation, sorting, FIR filtering quickly without the need for extensive iterative processing. By using the computation cells of the present invention in parallel, the computation of common DSP functions can be performed quickly and resulting in improvements in DSP performance as compared to convention DSPs.

23 Claims, 8 Drawing Sheets

METHODS AND APPARATUS FOR PERFORMING CORRELATION OPERATIONS

FIELD OF THE INVENTION

The present invention relates to methods and apparatus for performing digital signal processing operations and, more specifically, to methods and apparatus for enhancing digital signal processors.

BACKGROUND

As technology for digital electronics has advanced, digital signal processing using digital computers and/or customized digital signal processing circuits has become ever more important. Applications for digital signal processing include audio, video, speech processing, communications, system control, and many others. One particularly interesting application for digital signal processing is the communication of audio signals over the Internet.

The transmission of audio signals over the Internet offers the opportunity to communicate voice signals, in digital form, anywhere in the world at relatively little cost. As a result, there has been an ever growing interest in voice transmission over the Internet. In fact, Internet telephony is a fast growing business area due to is promise of reducing and/or eliminating much of the cost associated with telephone calls. In order to support Internet telephony and/or other applications which may be required to process digital audio and/or video signals, DSPs are frequently used.

Thus, DSPs used to process audio signals are found in digital telephones, audio add-in cards for personal computers, and in a wide variety of other devices. In addition to processing of audio signals, a single DSP may be called upon to processes a wide range of digital data including video data and numeric data.

Digital audio and/or video files or data streams representing sampled audio and/or video images can be rather large. In the interests of reducing the amount of memory required to store such files and/or the amount of bandwidth required to transmit such files, data compression is frequently used. In order to determine if a specific set of data, e.g., a subset of the data being subject to compression, will benefit from compression processing, a correlation operation is often performed. Data compression is then performed on subsets of the data being processed as a function of the output of the correlation operation. Accordingly, correlation operations are frequently performed when processing audio data, video data and other types of data.

As will be discussed in detail below, cross correlation generally involves processing two sequences of numbers, each sequence including e.g., N elements, to produce an output sequence which also has N elements, where N may be any positive integer. Each element of the input and output sequences is normally a number represented by one or more bits. Cross correlation processing generally requires N multiplications and N−1 additions to produce each of the N output elements. Thus, a total of $N^2$ multiples and $(N^2-N)$ additions must normally be performed to produce an N element cross correlation output.

From a cost standpoint, it is desirable to avoid building into a DSP a large amount of customized circuitry which is likely to be used only infrequently or is likely to go unused altogether. In typical DSP applications, software is normally used to configure adders, subtracters, multipliers and registers to perform various functions. In some cases, additional specialized circuitry may be included in the DSP. For example, some DSPs include a relatively small number, e.g., two, Multiply-and-Accumulate (MAC) processing units. The MAC processing units can be used to multiply 2 numbers and add the result into a storage register sometimes called an accumulator. MAC units may be reused under software control.

Since the number of MAC units in typical DSPs is relatively limited, computationally intensive calculations such as, e.g., cross-correlation, normally have to rely on software loops and/or multiple processing iterations to be completed.

In addition to cross-correlation, other frequently used DSP functions include sorting, finite impulse response filtering, convolution, vector sum, vector product, and min/max selection. In many applications, such functions generally involve arithmetic calculations applied to long sequences of numbers representing discrete signals.

In many applications, the amount of time available to process a set of data is limited to real world constraints, such as the rate at which digital data representing an audio signal will be use to generate audio signals that are presented to a listener. Real time processing is often used to refer to processing that needs to be performed at or near the rate at which data is generated or used in real world applications. In the case of audio communications systems, such as telephones, failure to process audio in or near real time can result in noticeable delays, noise, and/or signal loss.

While the use of iterative loops to perform signal processing operations serves to limit the need for specialized circuitry in a DSP, it also means that DSPs often need to support clock speeds which are much higher than would be required if more computationally complex operations could be performed without the need for iterative processing operations or with fewer iterative processing operations.

In view of the above discussion, it is apparent that there is a need for methods and apparatus which can be used to reduce the need for iterative processing operations in DSPs. It is desirable from an implementation standpoint, that any new circuitry be modular in design. It is also desirable that circuitry used to implement at least some new methods and apparatus be capable of being used to support one or more common DSP processing operations. In addition, from a hardware efficiency standpoint, it would be beneficial if at least some circuits were easily configurable so that they could be used to support multiple DSP processing operations.

SUMMARY OF THE INVENTION

The present invention is directed to methods and apparatus for improving the way in which digital signal processors perform a wide variety of common operations including cross-correlation, sorting, finite impulse response filtering, in addition to other operations which use multiply, add, subtract, compare and/or store functionality.

In accordance with various embodiments of the present invention, digital signal processors and/or other programmable circuits are enhanced through the addition of one or more computation engines. The computation engines of the present invention are of a modular design with each computation engine being constructed from a plurality of computation cells each of which may be of the same design. The computation cells are connected to form a sequence of cells capable of performing processing operations in parallel.

In embodiments where the computation results are read out of the last computation cell in a sequence of computation cells, the values resulting from the processing of each computation cell can be shifted out of the computation engine with the results being passed from computation cell to computation cell so that the results of multiple cells can be read.

The computation cells of the present invention may be implemented to perform a specific function such as cross-correlation, sorting or filtering. Thus, a computation engine may be dedicated to supporting a particular function such as cross-correlation.

However, in other embodiments, the computation cells are designed to be configurable allowing a computation engine to support a wide range of applications.

One or more multiplexers may be included in each computation cell to allow re-configuring of the computation cell and thus how signals are routed between the computation cell components and which computation cell components are used at any given time.

By reconfiguring the way in which the signals are supplied to the internal components of the computation cells and the way in which signals are passed between computation cell components, multiple signal processing operations can be performed using the same computation cell hardware.

A control value supplied to each computation cell in a computation engine can be used to control the components of the computation cells and how each of the computation cells is configured. In some embodiments, e.g., embodiments which support sorting, the configuration of a computation cell is also controlled, in part, by a cascade control signal generated by a preceding computation cell in the sequence of computation cells.

A control register may be included in the computation engine for storing the control value used to control the configuration of the individual computation cells included in the computation engine. The output of the control register is supplied to a control value input of each of a computation engine's computation cells. Thus, the configuration of the computation engine's computation cells can be modified by simply writing a new control value into the control register.

A control value may be several bits e.g., 12 bits, in length. In one embodiment, different fields of the 12 bit control signal are dedicated to controlling different elements of the computation cells. For example, different bits may be dedicated to controlling different multiplexers, while another set of bits is dedicated to controlling the resetting of values stored in computation cell storage devices, while yet another bit is set to control whether an adder/subtractor performs addition or subtraction.

In accordance with the present invention, a software controllable portion of a digital signal processor can be used to control the configuration of a computation engine of the present invention by periodically storing an updated control value in the computation engine's control register. In addition the software controllable portion of the digital signal processor can supply data to be processed to one or more data inputs included in the computation engine and receive, e.g., read out, the results of a processing operation performed by the computation engine of the present invention.

Both the software controllable digital signal processing circuitry and the computation engine of the present invention are, in various embodiments, implemented on the same semiconductor chip.

Because the present invention allows all or portions of many processing operations to be performed in parallel through the use of multiple computation circuits, processing efficiencies can be achieved as compared to embodiments where software loops are used in place of the parallel hardware circuits of the present invention.

Additional features, embodiments and benefits of the methods and apparatus of the present invention will be discussed below in the detailed description which follows.

DETAILED DESCRIPTION

Figure 1:
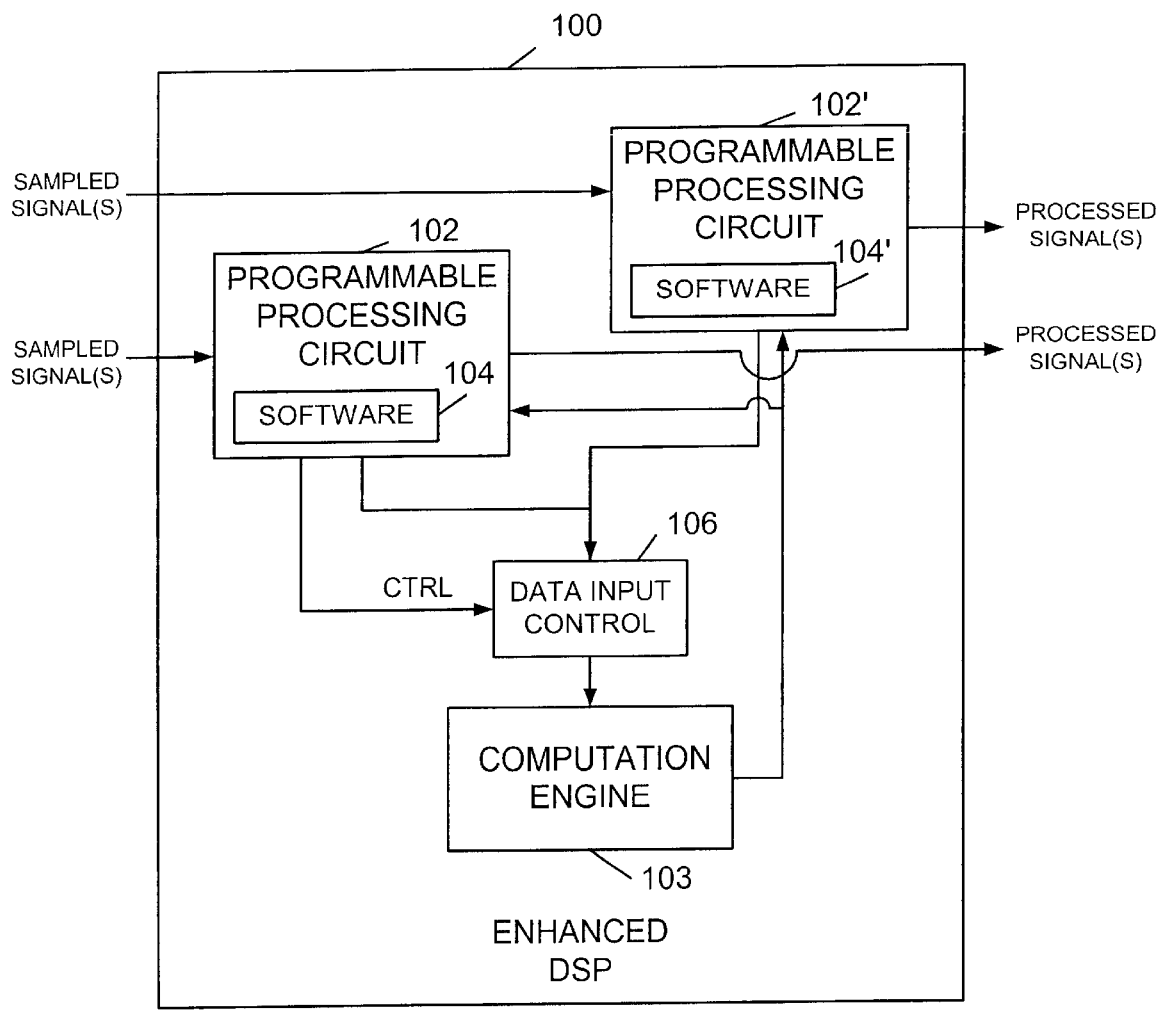
FIG. 1 illustrates an enhanced signal processor implemented in accordance with the present invention.

The present invention relates to methods and apparatus for enhancing digital signal processors. FIG. 1 illustrates a digital signal processor 100 implemented in accordance with the present invention. As illustrated the DSP 100 includes first and second programmable processing circuits 102, 102'. The programmable processing circuits 102, 102' include data inputs via which they can receive one or more data streams representing, e.g., sampled signals. Each data stream may correspond to, e.g., one or more physical or virtual voice channels. The programmable processing circuits 102, 102' process the received signals under control of software 104, 104' and in conjunction with computation engine 103 which is coupled to the programmable processing circuits 102. 104. Data input control circuit 106, which may be implemented using a multiplexer, determines which programmable processing circuit 102, 102' supplies data to the computation engine 103 at any given time. Data input control 106 is responsive to a control signal received from programmable processing circuit 102 to determine which of the two processors 102, 102' will supply data to the computation engine at any given time.

The processing performed by processing circuits 102, 102' operating in conjunction with the computation engine 103 may include various types of voice signal processing, e.g., data compression/decompression, filtering and/or identification of maximum values such as amplitude values, in blocks of data being processed. The data compression/decompression operation may involve performing one or more correlation operations. The filtering may be, e.g., finite impulse response (FIR) filtering, which is performed on one or more voice signals being processed. The sorting operation may involve identifying the maximum and/or minimum signal amplitude values in a block of data representing such values which is being processed.

Programmable processors 102, 102' share the computation engine as a common resource which can be used on a time shared basis. The computation engine 103, in accordance with the present invention, receives data and configuration information from one or both of the programmable processors 102, 102'.

Both the computation engine 103 and processing circuits 102, 102' may be implemented on the same semiconductor to form a single chip implementation of the enhanced DSP 100.

Programmable processing circuitry 102, 102' is capable of performing operations under software control as done in conventional DSP circuits. However, they also have the ability to control the configuration of the computation engine 103, to send data for processing to the computation engine 103 and to receive the results of processing operations performed by the computation engine 103. As will be discussed below, the computation engine 103 includes hardware circuitry which allows parallel processing operations to be performed on received data thereby facilitating many common operations, e.g., cross-correlation, sorting, and FIR filtering to name but a few examples.

The processing circuits 102, 102' receives digital data, e.g., sampled signals, to be processed. When a processing operation needs to be performed for which the computation engine 103 can be used, the processing circuits 102. 102' pass the data to be processed to the computation engine 103 and then receive back from the computation engine the result of the processing operation.

The data received back from the computation engine 103 may be used in further processing performed by the processing circuitry 102, 102'. The circuitry 102, 102' outputs processed signals, e.g., digital data, produced by the processing it performs. In some cases, the output of the computation engine 103 is used directly as the processed signal output of the digital signal processor 100.

In accordance with the present invention, the programmable processor 102 can configure the compuation engine to perform any one of a variety of supported operations. Thus, e.g., the programmable processor 102 may control the computation engine to first perform a correlation operation, then a filtering operation which may then be followed by another correlation operation or even a sorting operation. Virtually any order of supported operations is possible. Different operations may be used for processing different data streams, e.g., corresponding to different voice channels or paths whether they be physical or virtual. In a similar manner processing circuit 102' can control the configuration and thus processing of computation engine 103. Thus, the first programmable processing circuit 102 may use the computation engine to perform one or more correlation operations while the second processing circuit may control the computation engine to perform one or more other processing operations, e.g., FIR filtering or sorting.

While FIG. 1 illustrates two processing circuits 102, 102' it should be understood that additional processing circuits may share the computation engine 103 and/or the computation engine may be pared with a single processing circuit 102.

Figure 2:
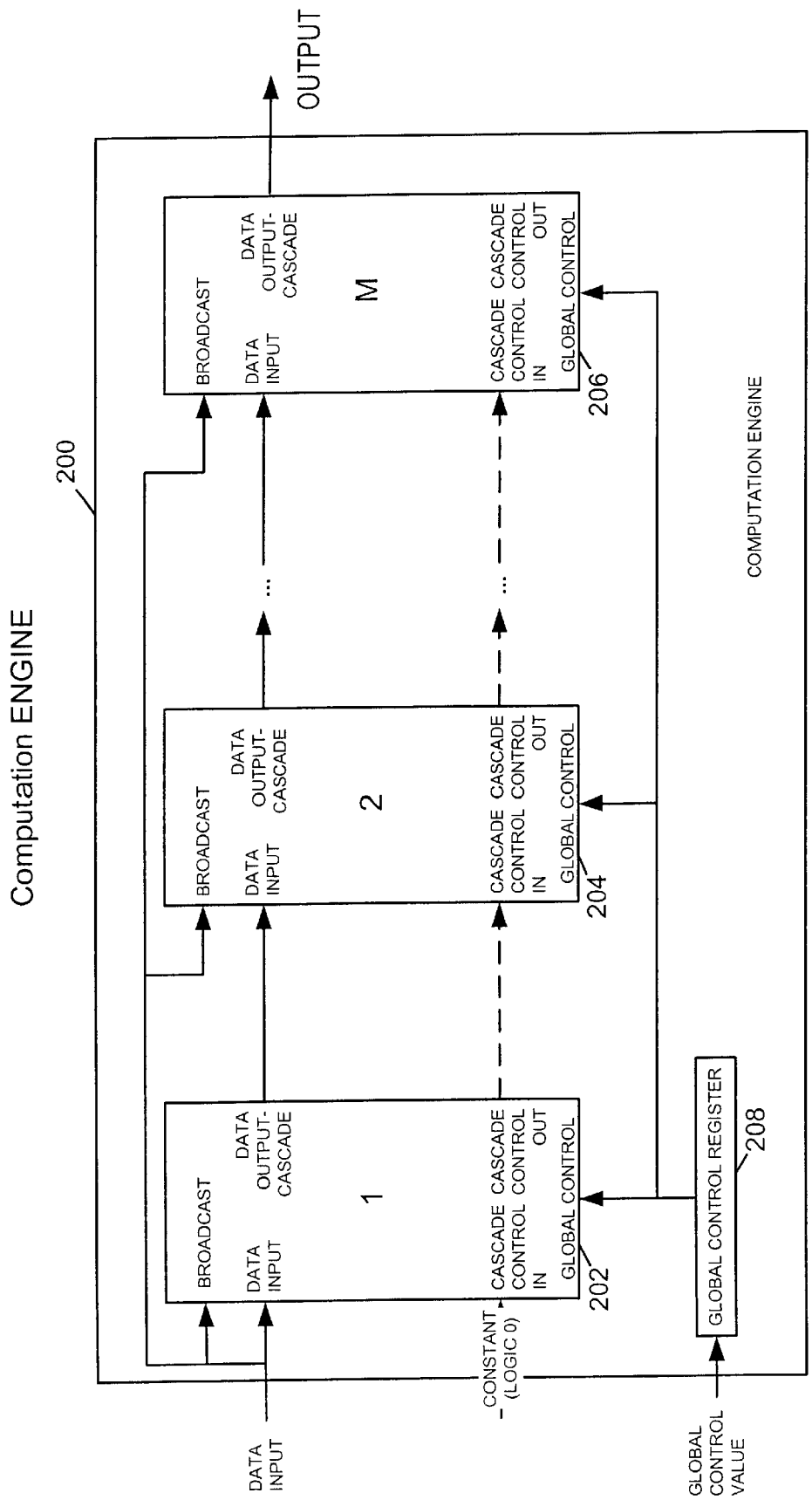
FIG. 2 illustrates a computation engine implemented in accordance with one exemplary embodiment of the present invention.

FIG. 2 illustrates a first exemplary computation engine 200 which may be used as the computation engine illustrated in FIG. 1. As illustrated, the exemplary computation engine includes a plurality of M computation cells 202, 204, 206 which are coupled together to form a sequence or cascade of first through Mth computation cells. As will be discussed below, each of the computation cells 202, 204, 206 may be implemented using the same or similar circuitry. This has the advantage of allowing for a simple and consistent method of controlling each of the computation cells 202, 204, 206. It can also help simplify the manufacturing of the computation engine 200 by avoiding the need to manufacture multiple unique circuits to implement each computation cell.

In the FIG. 2 embodiment, the computation cells are controlled in unison by bits of a global control value. The global control value is loaded into a global control register 208 which is coupled to a global control value input of each of the computation cells 202, 204, 206. In some embodiments, configuration of individual cells is further controlled by a cascade control signal which is generated from a preceding computation cell when a preceding computation cell is present.

Each computation cell 202, 204, 206 has several inputs and at least one output. The inputs include a data input, a broadcast input, and an optional cascade control signal input. The output of each computational cell includes a data signal output and, optionally, a cascade control signal output. Each signal input and output may correspond to one or more signal lines.

The data input of the computation engine 200 is coupled to the Broadcast input of each of the first through $M^{th}$ computation cells 202, 204, 206. In this manner, each computation cell is supplied with the input data received by the computation engine 200. The data input of the computation engine 200 is also coupled to the data input of the first computation cell 202.

The data output of each computation cell is coupled with the data input of the next computation cell in the sequence of M computation cells. The data output of the last (Mth) computation cell 206 is coupled to the data output of the computation engine 200.

In addition to data inputs and outputs, each computation cell may include an optional cascade control input and cascade control output. Since these signal inputs and outputs may be omitted in some embodiments, they are shown in FIG. 2 using dashed lines. When present, the cascade control input of the first computation cell 202 is supplied with a constant value, e.g., 0. The cascade control output of each of the first through M−1 computation cells, when present, are coupled to the cascade control input of the subsequent computation cell. The cascade control output of the Mth computation cell goes unused.

In various embodiments, the Data Input of the computation engine 200 and each computation cell 202, 204, 206 includes up to three distinct parallel data inputs. The data outputs of the computation engine and each computation cell normally includes the same number of distinct parallel data outputs as inputs.

The data input and data output of each computation cell 202, 204, 206 may be implemented as a single, double or triple data path. The three data signals which may be received via the data input, in the case of a triple data path implementation, are DATA1, DATA2 and DATA3. Similarly DATA1, DATA2, and DATA3 output signals may be generated by a computation cell. For each received data input signal a corresponding data output signal is normally generated and supplied to the corresponding data input of the next computation cell, in the sequence of cells 202, 204, 206. In the case where multiple parallel inputs are supported as part of the data input to each computation cell, one or more of the data inputs may be active at any time depending on the particular implementation and processing being performed.

In a similar manner, the Broadcast input may implemented as a single or a double input. In some embodiments, a single Broadcast input is used and a single broadcast signal is supplied to each of the computation cells while in other embodiments two broadcast inputs are used allowing for up to two broadcast signals, Broadcast1 and Broadcast2, to be received by each computation cell. Each Broadcast signal corresponds to a different one of the Data Input signals which may be supplied via parallel paths to the computation engine. Thus, via the Broadcast input, a Broadcast1 and/or Broadcast2 signal can be received. The Broadcast1 input of each computation cell 202, 204, 206, when present, is coupled to the DATA1 input of the computation engine 200 and therefore receives the same input signal as the DATA1 signal input of the first computation cell 202. The Broadcast2 signal of each computation cell 202, 204, 206, when present, is coupled to the DATA2 input of the computation engine and therefore receives the same input signal as the DATA2 input signal supplied to the first computation cell 202.

Figure 3:
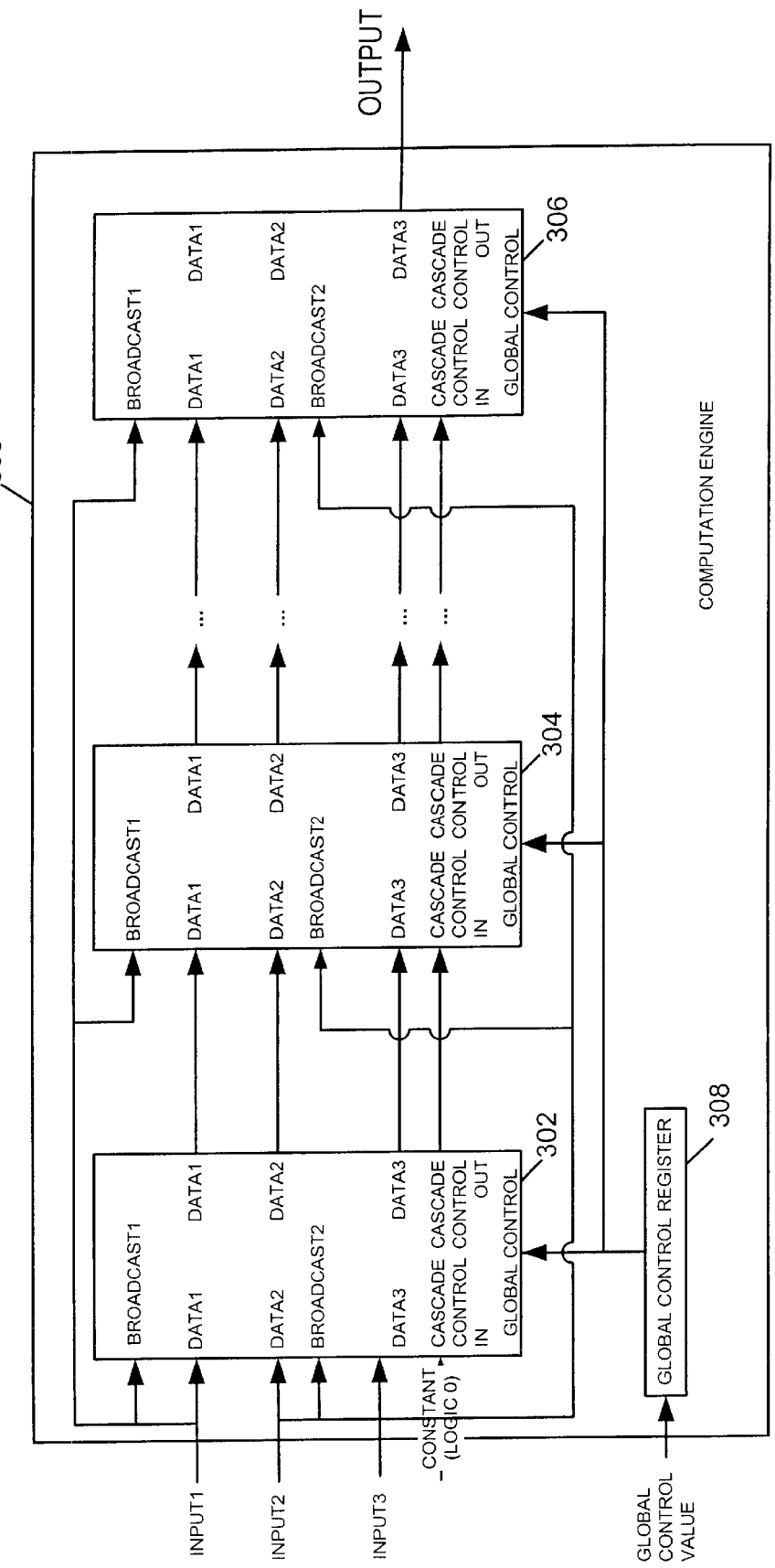
FIG. 3 illustrates a multi-purpose computation engine illustrated in accordance with another embodiment of the present invention.

FIG. 3 illustrates a computation engine300 where the DATA INPUT to the computation engine includes three parallel data inputs, DATA1, DATA2, DATA3. In addition, the data input and output of each computation cell 302, 304, 306 corresponds to three parallel data inputs and three parallel data outputs labeled DATA1, DATA2, DATA3. The data inputs DATA1, DATA2, DATA3 of the computation engine 300 are coupled to the corresponding data inputs of the first computation cell 302. The data outputs of each of the first through M−1 computation cells are coupled to the corresponding data inputs of the next computation cell in the sequence of computation cells 302, 304, 306.

In addition to being coupled to the DATA1 input of the first computation cell 302, the DATA1 input of the computation engine is coupled to a BROADCAST1 input of each of the computation cells 302, 304, 306. In a similar manner, the DATA2 input of the computation engine 300 is coupled to a BROADCAST2 input of each of the computation cells 302, 304, 306.

A value of zero is supplied to a cascade control input of the first computation cell 302. The cascade control output of each of the first through M−1 computation cells is coupled to the cascade control input of the next computation cell in the sequence of computation cells.

The DATA1, DATA2 and cascade control outputs of the Mth computation cell 306 go unused. The DATA3 output of the Mth computation cell 306 is coupled to the data output of the computation engine 300.

A global control register 308 is provided for storing a control value used to configure and/or reset components included in each of the M computation cells 302, 304, 306. A global control value input of the computation engine is coupled to a corresponding input of the global control register 308. A global control value output of the global control register is coupled to a corresponding input of each one of the computation cells 302, 304, 306.

The computation cells of the present invention used in the computation engine 200 or 300 may be implemented using a relatively small number of such basic elements as a multiplier, an adder, subtractor, adder/subtractor, and/or a comparator as the arithmetic elements. The computation cell normally also includes some memory elements, e.g., registers, so that previous input signals or the partial results of a long computation can be stored. Multiplexers that are controlled by different fields of the control value stored in the global control register and/or the cascaded control signal can be used configure the computation cell's elements and to direct various signals or the previously computed partial results of a long computation to the arithmetic elements for computation.

The computation cells of a computation engine 200, 300 of the present invention are controlled in unison by the value stored in the global control register and individually by cascade control signals generated internally and/or received from a preceding computation cell. Since the global control value output by global control register controls the configuration of computation cells, it is possible to reconfigure the computation cells of a computation engine by simply updating the global control value stored in the global control register 308.

The cascaded control signal, generated in some embodiments, by each of the computation cells, is used to further refine the functionality within individual computation cells. That is, a cascade control output (CCO) signal generated by a computation cell, based on one or more of its input signals, may be used to control the next computation cell in the sequence of first through Mth computation cells.

Figure 4:
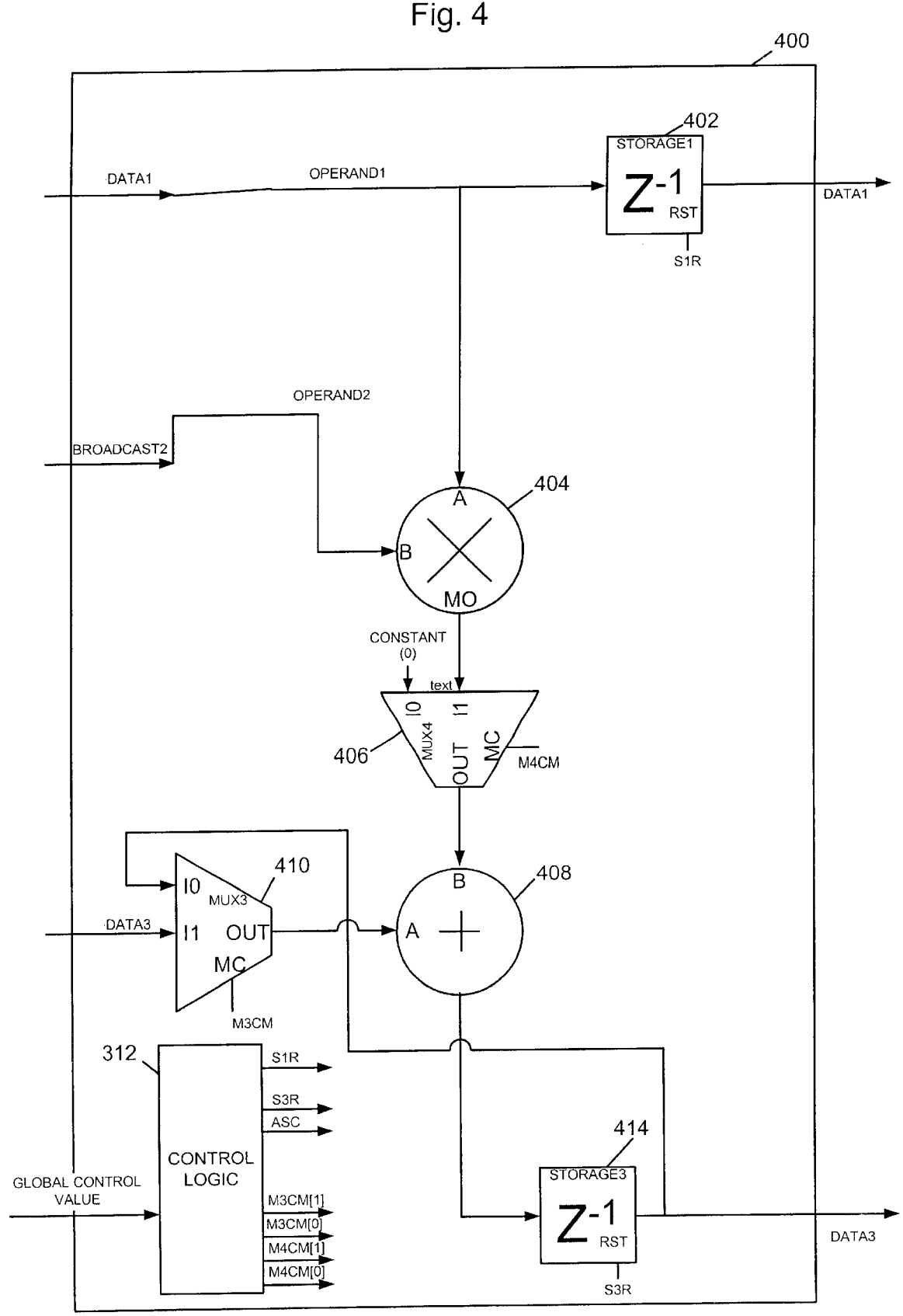
FIG. 4 illustrates a cross-correlation computation cell of the present invention suitable for use in the computation engine illustrated in FIG. 2.
Figure 5:
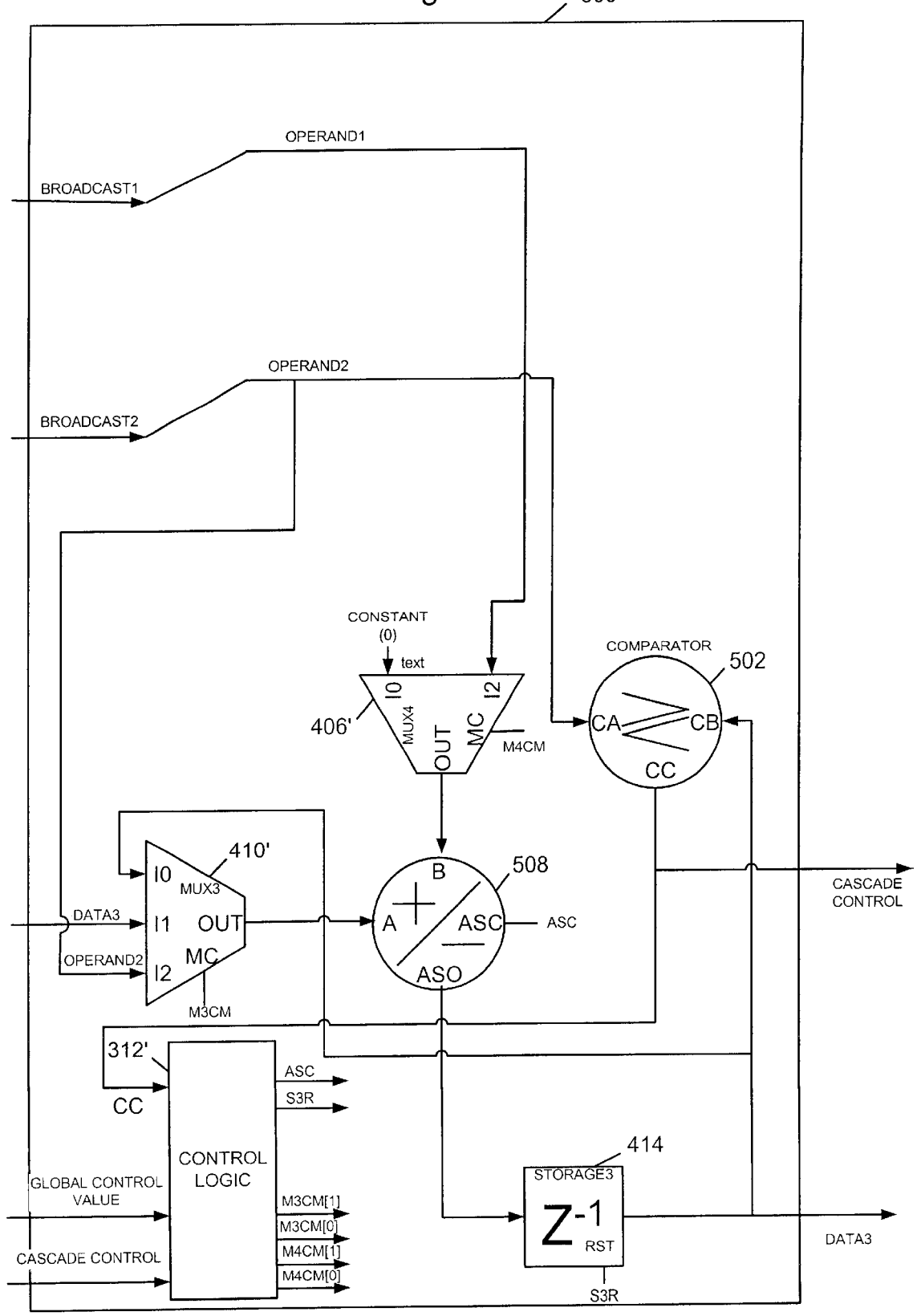
FIG. 5 illustrates a sorting cell of the present invention suitable for use in the computation engine illustrated in FIG. 2.
Figure 6:
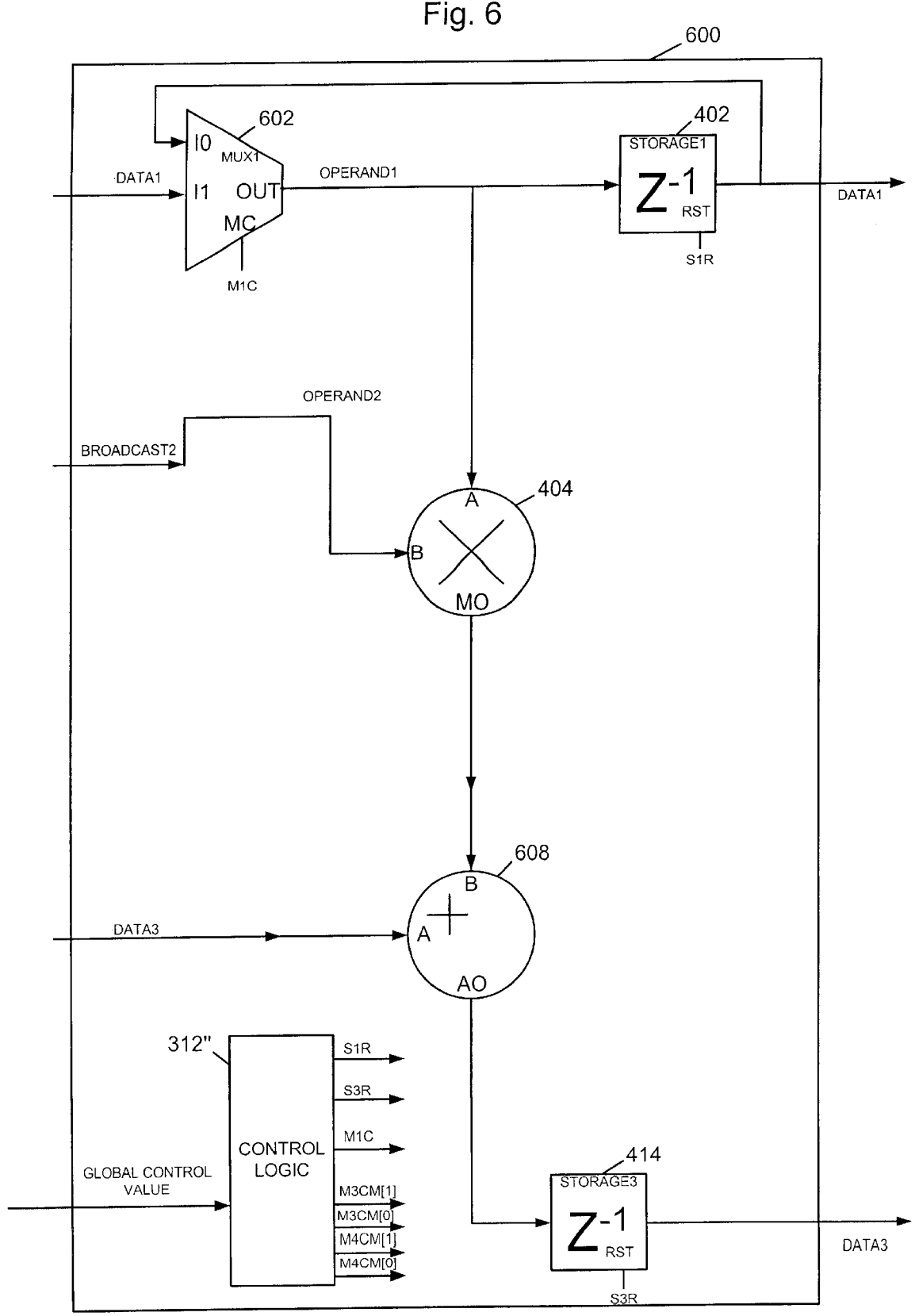
FIG. 6 illustrates an FIR filter cell of the present invention suitable for use in the computation engine illustrated in FIG. 2.

Individual computation cells, M of which may be used to implement the computation engine 200 or computation engine 300,are illustrated in FIGS. 4–7. The computation cells in FIGS. 4–6 are well suited for performing cross-correlation, sorting, and FIR filtering operations, respectively. Some of the computation cells illustrated in FIGS. 4–6 do not use all the inputs and outputs shown in the computation engine of FIG. 3. Accordingly, when a computation engine is constructed from computation cells which use fewer inputs and outputs than shown in FIG. 3, the signal paths, e.g., lines, and unused inputs/outputs may be omitted from the FIG. 3 computation engine in the interests of implementation efficiency.

The computation cell 400 illustrated in FIG. 4 is well suited for performing correlation operations. M of the FIG. 4 computation cells may be used to implement a computation engine 200, 300 suitable for performing M cross correlation operations in parallel. Some applications such as, e.g., speech compression, normally involve a large fixed number of cross correlation operations to be performed on units of data being communicated. It is desirable that the computation engine 400 include enough computation cells to perform the multiply, add, and accumulate computations associated with each element of a data sequence corresponding to a portion of a voice signal being processed, in one or a small number of clock cycles. If it is not possible to provide enough computation units to perform the cross-correlation processing in a single clock cycle, it is desirable that the number of computation cells be an integer divisor of the number of elements in a data sequence upon which a cross correlation operation is performed. Various exemplary numbers of computation cells which may be well suited in implementing a computation engine 200 or 300 for purposes of cross-correlation include 8, 10, 20, 40, 60, and 240. These numbers of computation cells are particularly useful in voice applications where various voice compression standards involve performing correlation operations on 40, 60, or 240 element sequences.

The computation cell 400 comprises a first storage element 402 labeled Storage 1, an additional storage element 414 labeled Storage 3, a multiplier 404, summer 408, a first MUX 406 labeled MUX4, and a second MUX 410 labeled MUX 3.

A first operand, Operandi, is received via a DATA1 input and is supplied to the computation cell's STORAGE1 storage element 402 and to an A input of multiplier 404. A second operand, operand2, is received via a Broadcast2 input of the computation cell 400 and supplied to a B input of multiplier 404. Multiplier 404 operates to multiply Operand1 and Operand2 together and to supply the result to an I1 input of MUX4 406. A logic value of 0 is applied to an I0 input of MUX4 MUX4 is controlled by the signal M4CM which will be discussed in detail below. MUX4, under control of the signal M4CM, operates to connect one of its inputs to its output at any given time. The output of MUX4 is coupled to a B input of summer 408.

A DATA3 input of the computation cell 400 is coupled to an I1 input of MUX3 410. In this manner, the Data3 signal generated by the previous computation cell or, if the computation cell 400 is the first computation cell in a computation engine, an input value of zero. MUX3 410 receives at its data input labeled I0 the value output by storage element 414 which corresponds to the DATA3 output of the computation cell 400.

MUX3 410 is controlled by control signal M3CM to connect one of its inputs to its output at any given time. The M3CM, like the M4CM control signal discussed elsewhere, is a two bit signal, with each bit of the signal being identified by a label [0] to indicate the lower order bit and [1] to indicate the higher order bit of the signal.

The output of MUX3 410 serves as input A to summer 408. The output of summer 408 is coupled to the input of STORAGE3 414. The output of STORAGE3 414 serves as the Data3 output of the computation cell 400.

The contents of STRORAGE1 and STORAGE3 may be reset to zero via storage control signals S1R and S3R, respectively. These control signals as well as control signals M3CM and M4CM are generated by control logic 312 from the global control value supplied to computation cell 400. A circuit which may be used as control logic 312 will be discussed in detail with regard to FIG. 8.

In the FIG. 4 embodiment, the control signals generated for each of the M computation cells in a computation engine 200 or 300 will be the same since they are generated from the same global control value. Accordingly, the control logic 312 may be placed in the computation engine 200 or 300 external to the individual computation cells 400. In this manner, a single control circuit 312 may be used to control each of the M computation cells 400 thereby eliminating the need for each of the M cells 400 to include a control logic circuit 312.

FIG. 5 illustrates a sorting computation cell 500 implemented in accordance with the present invention. M computation cells 500 may be used to implement a computation engine 200 or 300.

The computation cell 500 includes a first multiplexer labeled MUX4 406', a second multiplexer labeled MUX3 410', a controllable adder/subtractor 508, a comparator 502, and a storage element labeled STORAGE3 414. In regard to signal inputs, the sorting computation cell 500 includes a Broadcast1 input, a Broadcast2 input, a Data3 signal input, global control value input and a cascade control input. In regard to signal outputs, the sorting cell 500 includes a cascade control signal output and a Data3 signal output.

The components of the computation cell 500 are coupled together as illustrated in FIG. 5. In particular, the Broadcast1 input is coupled to an I2 input of MUX4 406'. Another input of MUX4, an I0 input, is supplied with a constant value of zero. The output of MUX4 406' is coupled to a B input of a controllable adder/summer 508.

The Broadcast2 input is coupled to an A input of the comparator 502 and to an I2 input of MUX3 410'. The Data3 input is coupled to an I1 input of MUX3 410'. Another input, an I0 input of MUX3 410' is coupled to the output of storage element STORAGE3 414. The output of MUX3 is coupled to an A input of the ASC 508. The ASC 508 receives as a control input an ASC control signal which corresponds to a pre-selected bit of the global control input value.

The output of ASC 508 is coupled to the input of STORAGE3 414. The output of STORAGE3 414 is coupled to the DATA3 output of the computation cell 500 in addition to a B input of comparator 502. The output of comparator 502 is coupled to the cascade control output of the computation cell 500.

Operation of the sorting computation cell 500 will be clear in view of the discussion of sorting performed by the multi-purpose computation cell 700 which may be configured to operate in generally the same manner as computation cell 500 for sorting purposes.

FIG. 6 illustrates an FIR filter computation cell 600 which supports programmable filter weights. The computation cell 600 of the present invention includes a multiplexer labeled MUX1 602, a controllable adder 608, a multiplier 404, and first and second storage elements 402, 414 labeled Storage1 and Storage3, respectively. In regard to signal inputs, the computation cell 600 includes a Data1 signal input, a Broadcast2 signal input, a Data3 signal input, and a global control value input. In regard to signal outputs, the FIR computation cell 600 includes DATA1 output and a DATA3 signal output.

The components of the computation cell 600 are coupled together as illustrated in FIG. 6. In particular, the Data1 input is coupled to an I1 input of MUX1 602. Another input of MUX1, an I0 input, is supplied with the value output by STORAGE1 402. The output of MUX1 602 is coupled to an A input of the multiplier 404 and to the input of STORAGE1 402.

The Broadcast2 input is coupled to a B input of the multiplier 404. The output of multiplier 404 is coupled to a B input of controllable adder/subtractor 508. The DATA3 input is coupled to an A input of the adder 608. The output of the adder 608 is coupled to the input of STORAGE3 414. The output of STORAGE3 414 is coupled to the DATA3 output of the computation cell 600.

The global control value signal input of the computation cell 600 is coupled to control logic 312" which generates from the global control value control signals used to control MUX1, adder 608 and to reset the contents of STORAGE1 402 and STORAGE3 414 as necessary.

In the FIG. 6 embodiment, the control signals generated for each of the M computation cells 600 in a computation engine 200 or 300 will be the same since they are generated from the same global control value. Accordingly, the control logic 312" may be placed in the computation engine 200 or 300 external to the individual computation cells 600.In this manner, a single control circuit 312" may be used to control each of the M computation cells 600 thereby eliminating the need for each of the M cells 600 to include a control logic circuit 312".

Operation of the FIR filter computation cell 600 will be clear in view of the discussion of filtering performed by the multi-purpose computation cell 700 which may be configured, for FIR filtering purposes, to operate in generally the same manner as computation cell 600.

Figure 7:
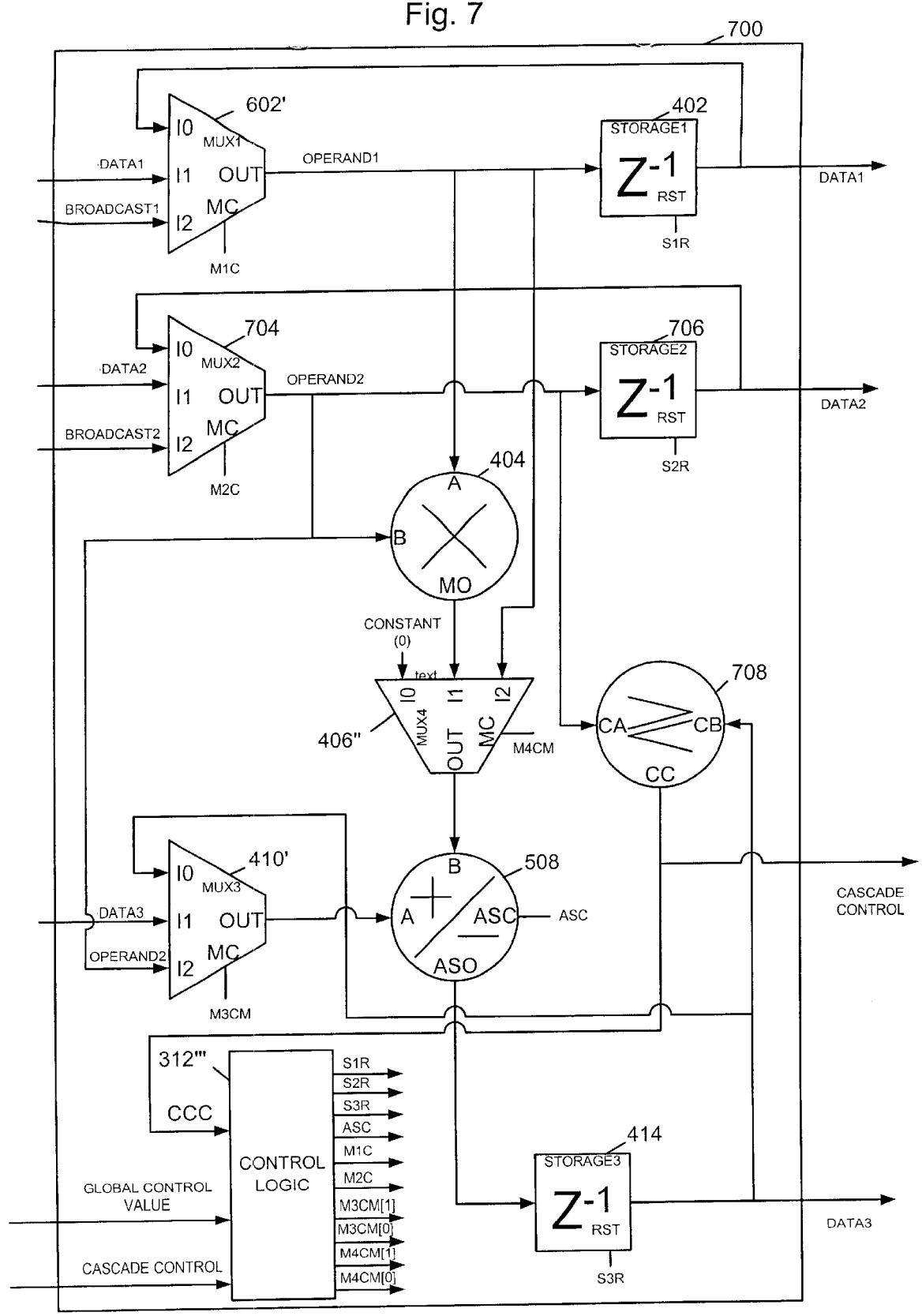
FIG. 7 illustrates a multi-purpose configurable computation cell of the present invention which may be used in the computation engines illustrated in FIGS. 2 or 3.

FIG. 7 illustrates a multi-purpose computation cell 700 which can be configured as part of a computation engine 200, 300 to perform a wide variety of tasks including cross correlation, sorting and FIR filtering to name but a few. M computation cells 700 may be used to implement the computation engine 200 or 300. In particular embodiments M is equal to 8, 10, 20, 40, 60, and 240 although other positive numbers for M are contemplated and possible. In most cases M is greater than 2.

In FIG. 7, the computation cell 700 comprises 4 multiplexers (MUXes) labeled MUX1 602, MUX2 704, MUX3 410', MUX4 406", 3 storage elements labeled STORAGE1 402, STORAGE2 706, STORAGE3 414, 1 multiplier 404, 1 adder/subtractor 508, and 1 comparator 708 in addition to a control circuit 312'". The various components of the computation cell 700 are coupled together as illustrated in FIG. 7. The control signals to the MUXes have been labeled M1C, M2C, M3CM, and M4CM for MUX1, MUX2, MUX3, and MUX4 respectively. In addition, the control signal for the adder/subtractor has been labeled ASC. The reset signals for the STORAGE1, STORAGE2 and STORAGE3 storage elements have been labeled S1R, S2R, S3R, respectively.

In some embodiments, STORAGE1 402 and STORAGE2 706 are of such a size that they can store the same number of bits of binary data while STORAGE3 414 is of such a size that it can store approximately twice the number of bits that STORAGE1 402 can store. The larger size of STORAGE3 414 is to accommodate the storage of the result of a multiplication and addition operation. The contents and output of STORAGE1 402, STORAGE2 706 and STORAGE3 414 will be reset to 0 when their respective reset signals S1R, S2R, or S3R are set to logic 1.

| MC | Mux Output |
|---|---|
| 00 | I0 |
| 01 | I1 |
| 10 | I2 |
| 11 | Don't care |

The global control value which is stored in the global control register 308 is used to configure, e.g., control the processing of, the computation engine 300 so it can perform different functions and computations as required for a particular application. Thus, the computation cells of a computation engine can be reconfigured to perform different functions and computations by simply loading a new control value into the global control register 208 which supplies the global control value to each of the individual computation cells.

For a computation engine 300 of the type illustrated in FIG. 3 implemented using M computation cells of the type illustrated in FIG., 7, a 12-bit global control value and global control register 308 can be used. In accordance with one exemplary embodiment of the present invention, the 12-bit value is divided into several bit fields with each bit field performing a different control function, e.g., by controlling a different circuit in each computation cell. The following table describes an exemplary bit field mapping of the global control value and thus global control register contents.

| Bit Number | 11 | 10 | 9 | 8 | 7:6 | 5:4 | 3:2 | 1.0 |
|---|---|---|---|---|---|---|---|---|
| Field Name | S1R | S2R | S3R | ASC | M1C | M2C | M3C | M4C |

Adder/subtractor 508 is controlled by the ASC signal which, as will be discussed below, is derived from the global control value output by the global control register. In some embodiments, the ASC signal corresponds to a selected bit of the global control value which may be a multi-bit value, e.g., a 12 bit value.

When ASC is set to a value of logic 0, the adder/subtractor performs addition (A+B) of its 2 inputs. When ASC is set to a value of logic 1, the adder/subtractor performs subtraction (A−B) of its 2 inputs.

The comparator 708 performs an arithmetic comparison of its 2 inputs and generates a single bit logic signal labeled CC. The output CC is logic 1 when the CA input is larger than or equal to the CB input (CA≧CB). The output CC is logic 0 when the CA input is less than the CB input (CA<CB).

The 4 MUXes 602, 704, 406", 410' in the computation cell are 3-input, 1-output MUXes. Thus, for each MUX, one of the MUX's 3 inputs will be coupled to its output at any time. Each MUX 602, 704, 406",410' are responsive to a 2-bit control signal (labeled MC) to determine which one of the inputs is coupled to the output at a particular point in time. The truth table below describes how the control signal supplied to a mux causes the mux to direct one of its inputs to its output.

Bit fields S1R, S2R, S3R correspond to the like named signals which are used to control whether the storage elements 1, 2, and 3 in the computation cells are reset to 0. The corresponding register bits can be directly connected to the storage element reset signal inputs in each of the computation cells or routed through a control logic circuit 312'" which is then responsible for coupling the register bit values to the storage element reset inputs. When S1R contains a 1, STORAGE1 is reset to 0. When S2R contains a 1, STORAGE2 is reset to 0. When S3R contains a 1, STORAGE3 is reset to 0.

Global control register bit field ASC is used to control whether the adder/subtractor performs additions or subtractions. The bits of the ASC register field can be directly connected to the ASC control input of the 508 included in each computation cell or through the control logic circuit 312'". When ASC has a logic value of 0, additions are performed by the controlled ASCs. When ASC has a logic value of 1, subtractions are performed by the controlled ASCs.

Global control register bit fields M1C and M2C are used to control the muxes M1 and M2 of each computation cell. They can be directly connected to the mux control signal inputs M1C and M2C of MUX1 and MUX2, respectively, or coupled thereto via control logic 312'".

Global control register bit fields M3C and M4C are used to control the muxes MUX3 410' and MUX4 406", respectively. The control of MUX3 and MUX4 also depends on the value of the cascade control output (CCO) signal generated by the computation cell in which the controlled MUX is located. The control is also a function of the value of the cascade control signal input to the computation cell in which the controlled MUX is located.

Control logic 312''' is responsible for generating the control signals M3CM and M4CM which are used to control muxes MUX3 410' and MUX4 406''. The following table illustrates the value of signals M3CM and M4CM, based on the indicated input values.

| M3C (or M4C) | M3CM (or M4CM) |
|---|---|
| 00 | 00 |
| 01 | 01 |
| 10 | 02 |
| 11 | Depends on Cascade Control Output (CCO) and Cascaded Control Input (CCI) |

Thus, the present invention provides a way to locally control MUX3 410' and MUX4 406'' of each computation cell based on the cascade control output and cascade control input associated with the computation cell being controlled.

The portion of the control circuit 312''' used to control MUX3 410' in each computation cell 700 can be described by the truth table below. The truth table describes how the M3CM control signal can be based on the M3C field of the global control value and the locally generated cascade control output (CCO) and the cascaded control input (CCI) obtained, e.g., from the previous computation cell 700 in the sequence of M computation cells.

| M3C | CCO | CCI | M3CM |
|---|---|---|---|
| 00 | X | X | 00 |
| 01 | X | X | 01 |
| 10 | X | X | 10 |
| 11 | 0 | 0 | 01 |
| 11 | 0 | 1 | 10 |
| 11 | 1 | 0 | 00 |
| 11 | 1 | 1 | 00 |

The 'X' marks in the above truth table denotes "don't cares" in digital logic where the 'X' can be either 0 or 1; the output is not affected.

Similarly, the portion of the control circuit 312''' used to control MUX4 406'' in each computation cell 700 can be described by the truth table below.

| M4C | CO | CCI | M4CM |
|---|---|---|---|
| 00 | X | X | 00 |
| 01 | X | X | 01 |
| 10 | X | X | 10 |
| 11 | 0 | 0 | 00 |
| 11 | 0 | 1 | 10 |
| 11 | 1 | 0 | 00 |
| 11 | 1 | 1 | 00 |

Figure 8:
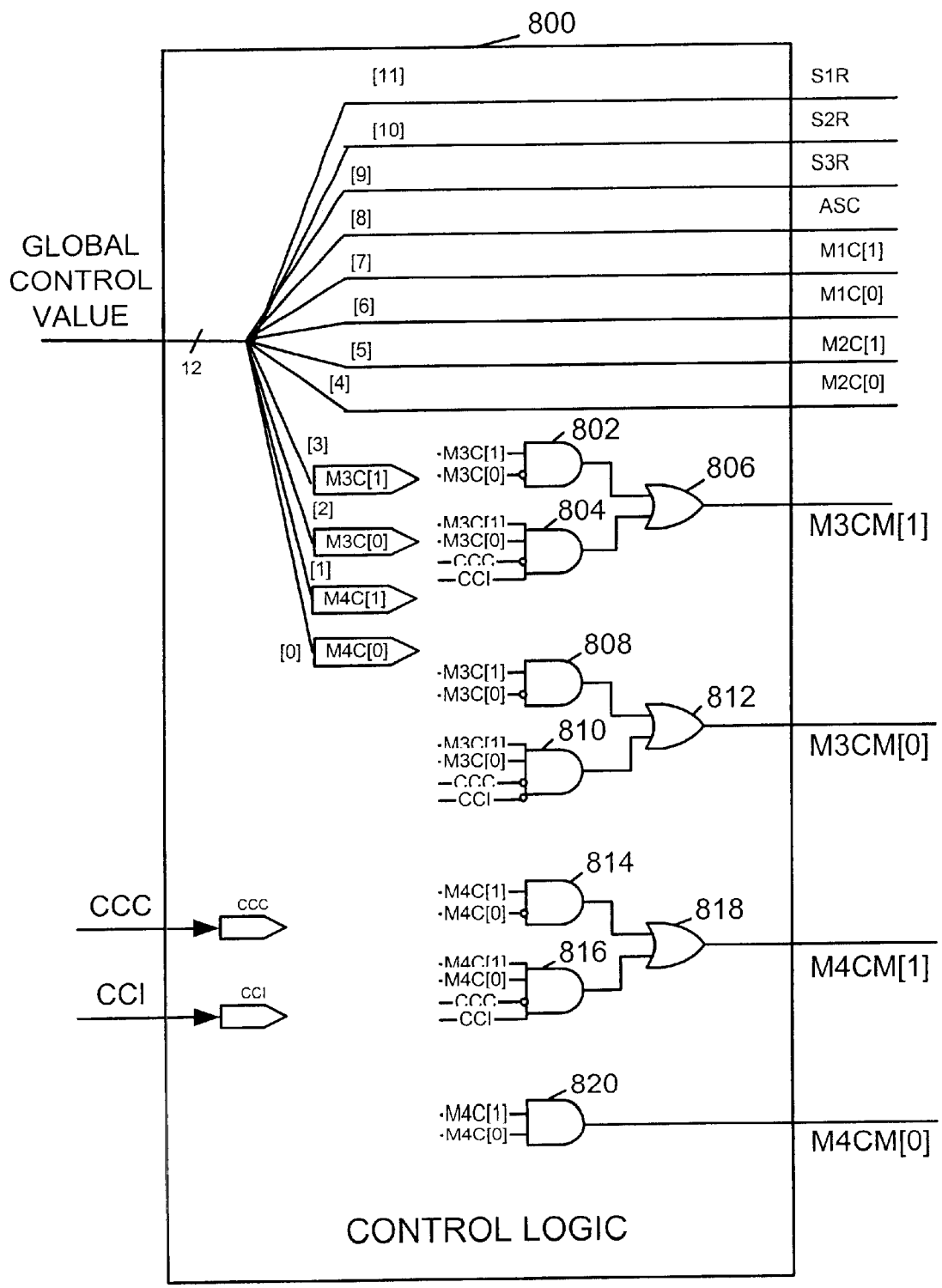
FIG. 8 illustrates control logic which may be used as the control logic of the multi-purpose configurable computation cell illustrated in FIG. 7.

A control circuit 800 that implements the functionality of the above 2 truth tables and which can be used as the control circuit 312''' is illustrated in FIG. 8.

As illustrated, the control circuit 800 includes first through seventh AND gates 802, 804, 808, 810, 814, 816, 820, and three OR gates 806, 812, 818, 820 arranged as illustrated in FIG. 8. Negated inputs of AND gates are illustrated in FIG. 8 using circles at the location of the negated AND gate input.

A global control value input receives the 12 bit global control value output by global control register 308. The bits of the global control value are divided into the individual signals to which they correspond and either output or supplied to the logic elements of the control circuit 800 as indicated through the use of labeling. A pointed connector is used to indicate a signal that is supplied to one or more correspondingly labeled AND gate inputs.

Global control value bits [0] and [1] which correspond to signals M4C[0] and M4C[1] are supplied to AND gates 814, 816 and 820. From these signals the AND gate 820 generates the signal M4CM[0] which is the lower bit of the signal M4CM.

And gate 816 receives the cascade control signals CCO and CCI in addition the signals M4C[0] and M4C[1]. The OR gate 818 ORs the output of the AND gates 814, 816 to generate the higher bit [1] of the M4CM signal.

Global control value bits [2] and [3] which correspond to signals M3C[0] and M3C[1] are supplied to AND gates 808, 810. And gate 810 is also supplied with the cascade control signals CCO and CCI. The OR gate 812 generates the lower bit [0] of the signal M3CM by ORing the outputs of AND gate 808 and 810.

Global control value bits [2] and [3] which correspond to signals M3C[0] and M3C[1] are also supplied to AND gates 802, 804. And gate 804 is also supplied with the cascade control signals CCO and CCI. The OR gate 806 generates the higher bit [1] of the signal M3CM by ORing the outputs of AND gate 802 and 804.

The control signals M2C, M1C, ASC, S3R, S2R, S1R are generated by the control circuit 810 by simply splitting out the corresponding bits of the global control value and using the appropriate bits as a control signal.

The control circuit 800 is suitable for use as the control logic circuit 312''' used in the computation cell illustrated in FIG. 7. Control circuits 312'', 312' and 312 may be implemented by using a control circuit which is the same as or similar to the one illustrated in FIG. 8. However, in such embodiments, unused inputs and outputs and the control logic used to generate unused outputs may be omitted for purposes of implementation efficiency and cost savings.

The multi-purpose computation cell 700 can be used to implement a computation engine 300 suitable for a wide range of applications, e.g., processing functions. Various processing operations as well as the configuring of the elements within a computation cell 700 to perform the processing functions will now be described.

Autocorrelation Functionality

Autocorrelation, a special case of cross-correlation, is an example of one function which can be performed using a computation engine 300 which includes computation cells 700.

An autocorrelation sequence for a finite sequence of numbers can be described with the following equation:

$$y_{xx}[n] = \sum_{k=0}^{N-1} x[k]x[k+n],$$

Where x[n] is a finite input sequence of N numbers and $y_{xx}[n]$ is the autocorrelation sequence of x[n]. To compute the autocorrelation sequence, $N^2/2$ multiplications and $(N^2-N)/2$ additions are required.

As discussed above, in typical microprocessors and DSPs with two or fewer MAC units, a software program with an iterative loop construct is required to compute this sequence. In the typical microprocessors or DSPs which have only 1 or 2 multiply or MAC units, the computation of N autocorrelation sequence numbers will normally take approximately $N^2$ or more computation cycles due to the hardware limitations.

With the computation engine 200 or 300 of the present invention, each computation cell 700 can be configured in the following fashion to compute the autocorrelation sequence:

1) STORAGE1, STORAGE2, and STORAGE3 are initialized to contain 0.

This step can be performed by writing the binary number "111000000000" into the global control register 208 or 308.

2) MUX1 selects DATA1 input to supply Operand1
3) MUX2 selects BROADCAST2 input to supply Operand2
4) MUX3 selects DATA3 as one of the inputs to the adder/subtractor 508
5) MUX4 selects the output of the multiplier 404 as the other input to the adder/subtractor 508.

These steps can be performed by writing the binary number "000000100101" into the global control register 208 or 308. For the entire computation engine 300, the input signals are configured in the following fashion:

6) The sequence of x[0], x[1], x[2], . . . , x[N−1] is fed to the DATA1 input, 1 per computation cycle.
7) The sequence of x[0], x[1], x[2], . . . , x[N−1], 1 per computation cycle, is also fed to DATA2 which is coupled to the BROADCAST2 input of each of the computation cells 700.

After 1 computation cycle, the first computation cell 302 would have computed x[0]x[0].

After 2 computation cycles, the first computation cell 302 would have computed x[0]x[0]+x[1]x[1], the second computation cell 304 would have computed x[0]x[1].

After N computation cycles, the first computation cell 302 would have computed:

$$x[0]x[0]+x[1]x[1]+ \ldots +x[N-1]x[N-1]=y_{xx}[0]$$

The second computation cell 304 would have computed:

$$x[0]x[1]+x[1]x[2]+ \ldots +x[N-2]x[N-1]=y_{xx}[1] \ldots$$

the Nth computation Cell (306 assuming N=M) would have computed:

$$x[0]x[N-1]=y_{xx}[N-1]$$

At this point, the computation engine 300 can be reconfigured (by writing "000000000100" into the global control register) so that in each of the computation cells 700:

8) MUX3 selects Input3 as one of the inputs to the adder 408.
9) MUX4 selects Constant (0) as the other input to the adder 408.

The output of the computation engine 300 can be used to shift out the autocorrelation sequence $y_{xx}[N-1]$, $y_{xx}[N-2]$, . . . , $y_{xx}[1]$, $y_{xx}[0]$. The number of computation cycles it takes to compute this autocorrelation sequence is N. An additional N cycles may be used to read out the result from the computation engine 300.

Cross-Correlation Functionality

The computation engine 300, implemented using computation cells 700, can also be used to perform cross-correlation operations.

A cross-correlation sequence for a finite sequence of real numbers can be described with the following equation:

$$y_{x1x2}[n] = \sum_{k=0}^{N-1} x_1[k]x_2[k+n],$$

where $x_1[n]$ and $x_2[n]$ are finite input sequence of N numbers and $Y_{x1x2}[n]$ is the cross-correlation sequence between $x_1[n]$ and $x_2[n]$. Like autocorrelation, it normally takes $N^2/2$ multiplications and $(N^2-N)/2$ additions to compute a cross-correlation sequence. In essence, an autocorrelation sequence is just a special case of a cross-correlation sequence.

With the computation engine 300, each computation cell 700 can be configured in the following fashion to compute the cross-correlation sequence:

1) STORAGE1 402, STORAGE2 706, and STORAGE3 414 are initialized to contain the value 0.

This step can be performed by writing the binary number "111000000000" into the global control register 308.

2) MUX1 602' selects the DATA1 input to supply Operand1
3) MUX2 704 selects the BROADCAST2 input to supply Operand2
4) MUX3 410' selects the DATA3 input as the source of one of the inputs to the adder/subtractor 508
5) MUX4 406" selects the output of the multiplier as the other input to the adder/subtractor 508.

These steps can be performed by writing the binary number "000000100101" into the global control register 308.

For the entire computation engine 300, at this point the input signals would be configured in the following fashion:

6) The sequence of $x_1[0]$, $x_1[1]$, $x_1[2]$, . . . , $x_1[N-1]$ is supplied to the computation engine DATA1 input, 1 per computation cycle.
7) The sequence of $x_2[0]$, $x_2[1]$, $x_2[2]$, . . . , $x_2[N-1]$ is supplied, 1 per computation cycle, to the computation engine's DATA2 input which is coupled to the DATA2 input of the first computation cell and to BROADCAST2 input of each one of the M computation cells.

After 1 computation cycle,

The first computation Cell 302 would have computed $X_1[0]x_2[0]$.

After 2 computation cycles,

The first computation cell 302 would have computed $x_1[0]x_2[0]+x_1[1]x_2[1]$, The second computation cell 304 would have computed $x_1[0]x_2[1]$.

After N computation cycles,

The first computation cell 302 would have computed $x_1[0]x_2[0]+x_1[1]x_2[1]+ \ldots +x_1[N-1]x_2[N-1]=y_{x1x2}[0]$ The second computation cell 304 would have computed $x_1[0]x_2[1]+x_1[1]x_2[2]+ \ldots +x_1[N-2]x_2[N-1]=y_{x1x2}[1]$ The Nth computation cell N (306 assuming N=M) would have computed $x_1[0]x_2[N-1]=y_{x1x2}[N-1]$ At this point, the computation engine 300 can be reconfigured, e.g., by writing "000000000100" into the global control register 308, so that in each of the computation cells:

8) MUX3 410 selects the DATA3 input to supply one of the inputs to the adder/subtractor 508.

9) MUX4 406" selects Constant (0) as the other input to the adder/subtractor 508.

The output of the computation engine 300 can be used to shift out the cross-correlation sequence $y_{x1x2}[N-1]$, $y_{x1x2}[N-2]$, ..., $y_{x1x2}[1]$, $y_{x1x2}[0]$. The number of computation cycles it takes to compute this cross-correlation sequence is N. It takes an additional N cycles to read out the result from the computation engine 300 assuming the engine 300 has N computation cells or the output is taken from the Nth computation cell 700 in the sequence of M computation cells.

Scalability of Cross-Correlation Functionality

The computation engine 300 of the present invention is scalable. A computation engine 200 or 300 with N computation cells can be used to compute correlation sequences shorter or longer than N.

To compute a cross-correlation of two sequences, each sequence including I elements, e.g., numbers, where I<N, the computation engine is loaded with the sequences of I numbers, the cross-correlation sequence is computed, and then the computation results stored in the N computation cells are shifted out of the computation engine. N–I of the values shifted out of the computation engine are not used, e.g., they are discarded, while the remaining I values representing the cross-correlation result are used. In one particular embodiment, the first N–I values read out of the computation engine are discarded while the remaining I values are supplied to the processor 102 as the correlation result.

Consider for example the case where a cross-correlation result is to be generated from two input sequences which are longer than N, e.g., each sequence having 2N elements. With the computation engine 200, 300, each computation cell 700 can be configured in the following fashion to compute the cross-correlation sequence of 2N numbers:

1) STORAGE1 402, STORAGE2 706, and STORAGE3 414 are initialized to contain 0.

2) MUX1 602' selects the DATA1 input to supply Operand1

3) MUX2 704 selects the BROADCAST2 input to supply Operand2

4) MUX3 410' selects the DATA3 input to supply one of the inputs to the adder/subtractor 508

5) MUX4 406" selects the output of the multiplier 404 as the other input to the adder/subtractor 508.

For the entire computation engine 300, the input signals are configured in the following fashion:

6) The first sequence of $x_1[0], x_1[1], x_1[2], \ldots, x_1[2N-1]$ is fed to the computation engine's DATA1 input, 1 per computation cycle.

7) The second sequence of $x_2[0], x_2[1], x_2[2], \ldots, x_2[2N-1]$ is fed, 1 per computation cycle, to the computation engine's DATA2 input is thus supplied to the DATA2 input of the first computation cell 302 in the sequence of computation cells 302, 306, 306.

After 2N computation cycles:
the first computation cell 302 would have computed:

$$x_1[0]x_2[0]+x_1[1]x_2[1]+\ldots+x_1[2N-1]x_2[2N-1]=y_{x1x2}[0]$$

the second computation cell 304 would have computed:

$$x_1[0]x_2[1]+x_1[1]x_2[2]+\ldots+x_1[2N-2]x_2[2N-1]=y_{x1x2}[1]$$

the Nth computation cell 306 would have computed:

$$x_1[0]x_2[N-1]+x_1[1]x_2[N]+\ldots+x_1[N]x_2[2N-1]=y_{x1x2}[N-1]$$

At this point, the computation engine 300 can be reconfigured so that in each of the computation cells 302, 304, 306:

8) MUX3 410' selects the DATA3 input to supply one of the inputs to the adder/subtractor 508.

9) MUX4 406" selects the logic value 0 as the other input to the adder/subtractor 508.

The output of the computation engine 300 can be used to shift out the cross-correlation sequence $y_{x1x2}[N-1]$, $y_{x1x2}[N-2]$, ..., $y_{x1x2}[1]$, $y_{x1x2}[0]$. This is half of the cross-correlation sequence for the 2N input. To complete the $2^{nd}$ half of the cross-correlation sequence, the computation cells are reconfigured as follows:

10) The contents of STORAGE1 402, STORAGE2 706, and STORAGE3 414 are cleared so that they contain the value 0.

11) MUX1 602', MUX2 704, MUX3 410', and MUX4 406" are configured as in steps 1 to 4.

For the entire computation engine 300, the input signals are then configured in the following fashion:

12) The first sequence of $x_1[0], x_1[1], x_1[2], \ldots, x_1[N-1]$ is fed to the DATA1 input of the computation engine, 1 per computation cycle.

13) The second sequence of $x_2[N]$, $x2$ $[N+1]$, $x_2[N+2], \ldots, x_2[2N-1]$ is also fed, 1 per computation cycle, to the computation engine's DATA2 signal input which is coupled to the DATA2 input of the first computation cell 302 and to the BROADCAST2 signal input of each one of the M computation cells 302, 304, 306.

After N computation cycles,
The first computation cell 302 would have computed:

$$x_1[0]x_2[N]+x_1[1]x_2[N+1]+\ldots+x_1[N-1]x_2[2N-1]=y_{x1x2}[N]$$

The second computation cell 2 would have computed:

$$x_1[0]x_2[N+1]+x_1[1]x_2[N+2]+\ldots+x_1[N-2]x_2[2N-1]=y_{x1x2}[N+1]$$

The Nth computation cell (306 assuming N=M) would have computed:

$$x_1[0]x_2[2N-1]+x_1[1]x_2[N]+\ldots+x_1[N]x_2[2N-1]=y_{x1x2}[2N-1]$$

The output of the computation engine 300 can be used to shift out the cross-correlation sequence $y_{x1x2}[2N-1]$, $y_{x1x2}[2N-2], \ldots, y_{x1x2}[N+1], y_{x1x2}[N]$. This is the $2^{nd}$ half of the cross-correlation sequence for the 2N input. The total number of computation cycles it takes to compute this cross-correlation sequence is 3N assuming the computation engine includes N computation cells (N=M). It takes an additional 2N cycles to read out the result from the computation engine 300.

In general, this computation method can be extended to compute the correlation sequence of Y×N numbers. The computations are divided into Y iterations. N correlation sequence numbers are computed in each iteration. The $1^{st}$ iteration uses Y×N computation cycles, the $2^{nd}$ iteration uses (Y–1)×N cycles, the $3^{rd}$ iteration uses (Y–2)×N cycles and the final $Y^{th}$ iteration uses N cycles, assuming use of a computation engine with N computation cells. Therefore, using an N cell computation engine 300, a correlation sequence of Y*N numbers can be computed in the following number of computation cycles:

$$N \times \sum_{i=1}^{Y} i = N \times \frac{Y(Y+1)}{2}$$

An additional YXN cycles are used to read out the result from the systolic computation engine.

Sorting Functionality

The computation engine 300 can also be used to sort a list of numbers. There are various published sorting algorithms available with the "fast" ones having an execution order $O(N\log_2 N)$, which means that the sorting algorithm's computation cycle is proportional to $N\log_2 N$, where N is the number of entries to be sorted. A slow algorithm might have an execution order $O(N^2)$.

The determining factor for a sorting algorithm usually has to do with the number of comparisons the algorithm must make between the entries in order to perform sorting.

With the computation engine of the present invention, N comparisons can be made simultaneously per computation cycle assuming the computation engine 300 includes N computation cells (N=M). Each computation cell 302, 304, 306 can compare its content with the current entry in the list of numbers being sorted to determine the proper location in the final, sorted, list.

To perform such a sorting algorithm, the computation engine 300 can be configured in the following fashion:

1) MUX1 602' selects the BROADCAST1 signal input to supply Operand1
2) MUX2 704 selects the Broadcast2 signal input to supply Operand2
3) STORAGE3 414 stores both the entries and its associated index in the unsorted list. This can be accomplished because STORAGE3 414 has approximately twice the bit-width as required to store any entry in the unsorted list. STORAGE3 414 can be split to store the index of the entry on the top half (most significant bits) and the entry itself on the bottom half (least significant bits) of the bits.
4) MUX3 410' is controlled by the cascade control input signal (set to 0 in the case of the first computation cell 302 and received from the previous computation cell for each of the other computation cells) and the cascade control output of the current computation cell obtained from comparator 708.
   If the comparator result indicates that Operand2 is greater than the number portion of the DATA3 input signal, then MUX3 410' selects the DATA3 input signal as one input to the adder.
   If the comparator result indicates that Operand2 is less than the number portion of the DATA3 input signal AND the cascade control signal from the previous computation cell also indicates so, then MUX3 410' selects the DATA3 input signal as one input to the adder.
   If the comparator result indicates that Operand2 is less than the number portion of the DATA3 input AND the cascade control input signal from the previous computation cell indicates that Operand2 was greater than the number portion of the DATA3 input signal in the previous computation cell, then MUX3 410' selects Operand2 (prepended with 0 on the index portion) as one input to the adder.
5) MUX4 406" is controlled by the cascaded control input signal received from the previous computation cell and the comparator result, e.g., the cascade control output signal generated by the current computation cell:
   If the comparator result indicates that Operand2 is greater than the number portion of the DATA3 input signal, then MUX4 406" selects Constant 0 as the other input to the adder 508.
   If the comparator result indicates that Operand2 is less than the number portion of DATA3 input signal AND the cascaded control input signal received from the previous computation cell also indicates so, then MUX4 406" selects Constant 0 as the other input to the adder 508.
   If the comparator result indicates that Operand2 is less than the number portion of the DATA3 input signal AND the cascaded control input signal received from the previous computation cell indicates that Operand2 was greater than the number portion of DATA3 input signal in the previous computation cell, then MUX4 406" selects Operand1 (appended with 0 on the entry portion) as the other input to the adder.

The combination of what MUX3 410' and MUX4 406" select as the input to the adder has the following effect:

If the comparator result indicates that Operand2 is greater than the number portion of the DATA3 input signal, then the DATA3 input signal is stored back into STORAGE3 414.

If the comparator result indicates that Operand2 is less than the number portion of DATA3 input signal AND the cascade control signal received from the previous computation cell also indicates so, then the DATA3 input signal is stored in STORAGE3 414.

If the comparator result indicates that Operand2 is less than the number portion of the DATA3 input signal AND the cascade control signal received from the previous computation cell indicates that Operand2 was greater than the number portion of the DATA3 input signal in the previous computation cell, then Operand2 and its associated index is stored into STORAGE3 414.

The above steps can be performed by simply writing "000010101111" into the global control register 308.

For the entire computation engine 300, the input signals are configured in the following fashion:

6) The sequence of 0, 1, 2, . . . , N−1 as the index to the unsorted list is fed, one computation cycle at a time, to the DATA1 signal input thereby resulting in the signal being supplied to the BROADCAST1 input of each computation cell in the computation engine 300.
7) The sequence of x[0], x[1], x[2], . . . , x[N−1] as the entry to the unsorted list is fed, one computation cycle at a time, to the DATA2 input of the computation engine 300 thereby resulting in the signal being supplied to the BROADCAST2 input of each of the computation cells in the computation engine 300.

The configuration of the computation engine 300 effectively implements an insertion sort algorithm. After N computation cycles, the systolic computation engine can be reconfigured so that in each computation cell:

8) MUX3 410' selects the DATA3 input signal as one of input to the adder 508.
9) MUX4 406" selects Constant (0) as the other input to the adder 508.

The output of the computation engine 300 can be used to shift out the sorted sequence of numbers and their associated index in the unsorted sequence, from the largest to the smallest. The number of computation cycles used to complete the sorting is N. An additional N cycles are used to read out the result from the computation engine 300.

FIR Filtering Functionality

With the computation engine 300, the engine's computation cells can be configured in the following fashion to compute an FIR (finite impulse response) filter output sequence:

1) STORAGE1 402 is initialized to contain the filter impulse response or the filter coefficients in reverse, i.e., the first computation cell 302 will have h[N−1] in STORAGE1 402, the second computation cell 304 will have h[N−2] in its STORAGE1 402, and so on. Computation Cell N will have h[0] in its STORAGE1 402. This will generally take N computation cycles to complete the configuration, e.g., loading of filter coefficients in to the STORAGE1 elements of individual computation cells.
2) STORAGE3 is initialized to contain 0 for each of the computation cells 302, 304, 306 in the computation engine 300.
3) MUX1 602 selects the DATA1 input signal to supply Operand1.
4) MUX2 704 selects BROADCAST2 input to supply Operand2
5) MUX3 410' selects the DATA3 input to provide one of the inputs to the adder/subtractor 508.
6) MUX4 406" selects the output of the multiplier 404 as the other input to the adder/subtractor 508.

The computation engine 300 can be configured to perform step 1 by writing "000001000000" into the global control register 308. Step 2 can be accomplished by writing "001000000000" into the global control register 308. Steps 3 to 6 can be accomplished by writing "000000100101" into the global control register 308.

7) The sequence of x[0], x[1], x[2], . . . , x[N−1], and so on, is fed 1 per computation cycle, to the DATA2 input of the computation engine which is coupled to the DATA2 input of the first computation cell 302 and to the BROADCAST2 input of each of the computation engine computation cells 302, 304, 306.
8) The constant 0 is fed to DATA3 input of the computation engine 300.

The output of the computation engine 300 can be used to read the filter output sequence y[0], y[1], . . . , y[N−2], y[N−1], and so on.

The computation engine of the present invention cal also be used to implement the convolution of 2 sequences since a convolution can be expressed by the same equation as that used to represent the supported FIR filter discussed above.

Parallel Multiply and Accumulate Functionality

The computation engine 300 implemented using computation cells 700 can also be configured to be a parallel MAC unit capable of performing N multiply-and-accumulate operations at once (assuming N=M) by writing "000000000001" into the global control register 308. In such an application, N computation cycles are used to shift in the operands, e.g., by writing "110000000000" into the global control register, and N computation cycles are used to shift out the result. The shifting out of the result may be achieved by writing "001000000000" into the global control register 308. Thus, the computation engine 300 of the present invention can be used to provide high speed MAC unit functionality to a microcontroller, DSP or other digital circuit.

Additional Functionality

The following table summarizes various functions, with their associated global control register encoding, that can be performed by a computation engine 300 which is implemented using multipurpose computation cells 700.

|  | S1R | S2R | S3R | ASC | M1C | M2C | M3C | M4C |
| --- | --- | --- | --- | --- | --- | --- | --- | --- |
| No Operations (NOP) | 0 | 0 | 0 | 0 | 00 | 00 | 00 | 00 |
| Reset Storage 1 | 1 | 0 | 0 | 0 | 00 | 00 | 00 | 00 |
| Reset Storage 2 | 0 | 1 | 0 | 0 | 00 | 00 | 00 | 00 |
| Reset Storage 3 | 0 | 0 | 1 | 0 | 00 | 00 | 00 | 00 |
| Shift Storage 1 | 0 | 0 | 0 | 0 | 01 | 00 | 00 | 00 |
| Shift Storage 2 | 0 | 0 | 0 | 0 | 00 | 01 | 00 | 00 |
| Shift Storage 3 | 0 | 0 | 0 | 0 | 00 | 00 | 01 | 00 |
| Compute Correlations | 0 | 0 | 0 | 0 | 01 | 10 | 00 | 01 |
| Compute FIR | 0 | 0 | 0 | 0 | 00 | 10 | 01 | 01 |
| Sort | 0 | 0 | 0 | 0 | 10 | 10 | 11 | 11 |
| Parallel Multiply and Add | 0 | 0 | 0 | 0 | 00 | 00 | 00 | 01 |
| Parallel Multiply and Subtract | 0 | 0 | 0 | 1 | 00 | 00 | 00 | 01 |

Note that some of the functions can be combined to be performed together. For example, functions reset storage1, reset storage2, and reset storage3 can be performed together when "111000000000" is written into the global control register. Similarly, functions shift STORAGE1 and shift STORAGE2 can be performed together when "00001010000" is written into the global control register.

Variations on the above described exemplary embodiments will be apparent to those skilled in the art in view of the above description of the invention. Such embodiments are considered to be part of the present invention.

For example, the computation engine of the present invention may, and in one embodiment does, include parallel outputs so that the processing result generated by each computation cell can be read our in parallel thereby avoiding the need to shift out the computation result. In addition, the computation engine of the present invention can be configured and used to perform a wide variety of processing operations in addition to those specifically described herein. Furthermore, while voice processing applications have been described, the computation engine of the present invention may be used in any number of processing applications and is not limited to audio and/or voice data processing applications.

What is claimed is:

1. A method of performing a correlation operation on two sequences of input numbers, comprising the steps of:
   providing a sequence of M computation cells where M is an integer greater than two, each computation cell in the sequence of computation cells including circuitry for performing a correlation processing operation including multiplying one value corresponding to each one of the two sequences of input numbers together and adding a third value to the result;

operating a subset of N of said M computation cells in the sequence of computation cells, where N<M, to perform correlation processing operations in parallel and to store the result of the processing performed by each of the computation cells in a different one of N storage locations, the third value added by at least one of said subset of N computation cells as part of performing a correlation processing operation being an accumulated result of multiplication performed by said at least one cell; and reading out a result of the correlation processing operations by reading the results stored in the N storage locations.

2. The method of claim 1, further comprising, prior to operating the plurality of the computation cells:

supplying at least one number from each of said subset of N computation cells.

3. The method of claim 1, wherein said correlation operation is an auto-correlation operation; and wherein said two sequences of input numbers are identical.

4. The method of claim 1, wherein the correlation operation is a cross-correlation operation; and wherein the step of operating the subset of computation cells to perform correlation processing operations includes operating the subset of said plurality of computation cells to perform cross-correlation processing operations.

5. The method of claim 1, wherein the correlation operation is a auto-correlation operation; and wherein the step of operating the sequence of computation cells to perform correlation processing operations includes operating the sequence of computation cells to perform auto-correlation processing operations.

6. The method of claim 1, further comprising the steps of:

operating a software controllable processing circuit to supply two sequences of values to a first one of the N computation cells in the subset of N computation cells, each sequence including N values.

7. The method of claim 6, further comprising the step of:

operating the software controllable processing circuit to send a control signal to the subset of N computation cells to control the operation of said computation cells.

8. A method of performing a correlation operation on two sequences of input numbers, comprising the steps of:

providing a sequence of M computation cells where M is an integer greater than two, each computation cell in the sequence of computation cells including circuitry for performing a correlation processing operation;

operating the sequence of computation cells to perform correlation processing operations in parallel and to store the result of the processing performed by each of the computation cells in a different one of M storage locations, each one of the M storage locations being a register included in a different one of the M computation cells; and reading out a result of the correlation processing operations by reading the results stored in the M storage locations, the step of reading out a complete result of the correlation operation including:

shifting out the contents of each of the M registers so that the contents of the M registers exits the sequence of M computation cells through a data output of the last computation cell in the sequence of M computation cells.

9. The data processing method of claim 9, further comprising the step of:

providing a multi-bit control value to each of the M computation cells to control the operation of said computation cells.

10. The data processing method of claim 9, further comprising the step of:

setting the multi-bit control value to a first value to configure the M computation cells to perform the correlation processing operations; and setting the multi-bit control value to a second value to configure the M computation cells to shift out the contents of the M registers.

11. The data processing method of claim 9, further comprising:

storing the multi-bit control value in a storage device; and coupling an output of the storage device to each of the M computation cells.

12. A method of performing a cross-correlation operation comprising the steps of:

providing a set of M computation cells capable of performing correlation processing operations in parallel, wherein M is an integer greater than 2, the set of M computation cells including first and second inputs;

supplying two sequences of N data values, wherein N<M, to the set of M computation cells, each sequence of N data values being supplied to a different one of the first and second inputs; and operating N of said M computation cells to perform correlation processing operations in parallel, the processing performed by each of said at least N computation cells including multiplying one value corresponding to each of the first and second sequences together and adding a third value to the result, the step of operating at least one of the N cells including generating the third value added by said at least one cell by accumulating the result of the multiplication performed by said at least one cell; and outputting from said set of M computation cells a set of N values representing a cross-correlation result.

13. The method of claim 12, wherein the M computation cells are coupled together in series to form a series of M computation cells, the step of outputting from said set of M computation cells including shifting out at least N values from the Mth computation cell in the series of M computation cells.

14. The method of claim 12, wherein the step of outputting from said set of M computation cells including reading out in parallel N values from N of said M computation cells.

15. A method of performing a correlation operation comprising the steps of:

providing a set of M computation cells capable of performing correlation processing operations in parallel, the M computation cells being coupled together in series to form a series of M computation cells, wherein M is an integer greater than 2;

supplying two sequences of N values, wherein N<M, to the set of M computation cells;

operating at least N of said M computation cells to perform correlation processing operations in parallel; and outputting from said set of M computation cells a set of N values representing a correlation result, the step of outputting from said set of M computation cells including shifting out at least M values from the Mth computation cell in the series of M computation cells.

16. The method of claim 15, wherein the step of outputting from said set of M computation cells further includes discarding M-N of the M values shifted out of the Mth computation cell.

17. A device for performing a cross-correlation operation on digital data, the device comprising:

a plurality of M sequentially coupled cross-correlation computation cells; and means for controlling a subset of N of said M cross-correlation computation cells to perform a cross-correlation operation on two sets of N input values and to control each one of said N computation cells to output one value of an N value cross-correlation result, where N and M are integers and where N<M;

each cross-correlation computation cell having first, second and third inputs and a data output, each of the first and second inputs of the first computation cell in said sequence for receiving at least a portion of said digital data, the data output of the first computation cell being coupled to the third input of the next computation cell in the sequence of N computation cells, the data output of the last computation cell being for outputting at least a portion of a result of said cross-correlation operation, each cross-correlation cell further comprising:

a multiplying device including first and second inputs coupled to the first and second inputs of the computation cell, respectively, and an output;

an adding device coupled to the output of said multiplier device; and a data storage device coupled to an output of said adding device.

18. The device of claim 17, further comprising:

a control register, coupled to each of M cross-correlation computation cells for storing a control value used to control the internal configuration of connections inside the subset of the N computation cells.

19. The device of claim 17, wherein N is at least 3.

20. A device for performing a correlation operation on digital data, the device comprising:

a plurality of N sequentially coupled correlation computation cells, each correlation computation cell having a data input and a data output, the data input of the first computation cell in said sequence for receiving at least a portion of said digital data, the data output of the first computation cell being coupled to the data input of the next computation cell in the sequence of N computation cells, the data output of the last computation cell being for outputting a result of said correlation operation, each correlation cell further comprising:

a multiplying device coupled to the data input of the computation cell;

an adding device coupled to said multiplier device; and a data storage device coupled to an output of said adding device; and means for shifting out from the last computation cell, in the sequence of N computation cells, one value generated by each of the N computation cells to form a sequence of N correlation values representing the result of a correlation operation.

21. The device of claim 20, wherein N is at least 3.

22. A device for performing a correlation operation on digital data, the device comprising:

a plurality of N sequentially coupled correlation computation cells, wherein N is an integer multiple of 8, each correlation computation cell having a data input and a data output, the data input of the first computation cell in said sequence for receiving at least a portion of said digital data, the data output of the first computation cell being coupled to the data input of the next computation cell in the sequence of N computation cells, the data output of the last computation cell being for outputting a result of said correlation operation, each correlation cell further comprising:

a multiplying device coupled to the data input of the computation cell;

an adding device coupled to said multiplier device; and a data storage device coupled to an output of said adding device.

23. The device of claim 22, wherein N is at least 80.

* * * * *